3,228,966
DIMETHYL FURAN PRODUCTION FROM MESITYL OXIDE
Charles R. Adams, Oakland, Calif., assignor to Shell Oil Company, New York, N.Y., a corporation of Delaware
No Drawing. Filed Nov. 12, 1963, Ser. No. 323,142
7 Claims. (Cl. 260—346.1)

This invention relates to the preparation of dimethyl furan and more particularly to the production of dimethyl furan by the catalytic conversion of mesityl oxide.

Dimethyl furan has been found to be valuable as a general solvent for a number of organic materials. Interest in dimethyl furan is enhanced since the present invention now enables dimethyl furan to be prepared from a relatively inexpensive and readily obtainable material, namely acetone.

It has now been found that dimethyl furan is prepared by the catalytic conversion of mesityl oxide to dimethyl furan in the presence of oxygen or a sulfur oxide and a suitable catalyst at temperatures above about 300° C.

Mesityl oxide is a well known material which may be prepared by a number of methods. It is obtained by the condensation of acetone in the presence of a strong acid such as concentrated $H_2SO_4$ or HCl. In this reaction two moles of acetone yield mesityl oxide directly. Another method is the condensation of two moles of acetone in the presence of an alkali metal hydroxide, calcium hydroxide, or barium hydroxide to yield diacetone alcohol (4-methyl-4-pentanol-2-one) which is then dehydrated by heating in the presence of small quantities of iodine or an acid to give mesityl oxide. Either of these as well as other methods may be used to prepare mesityl oxide used in this invention. The methods briefly described above are well known to those skilled in the art. Mesityl oxide is also commercially available.

By the process of this invention mesityl oxide may be converted to dimethyl furan in the presence of oxygen or a sulfur oxide at temperatures above about 300° C. The mechanism by which either oxygen or sulfur oxide works in the catalytic mesityl oxide conversion to dimethyl furan is not certain at this time. However, either oxygen or sulfur oxide may be used with sulfur dioxide being the preferred sulfur oxide.

The catalysts which may be used in the process of this invention may be represented by the following formula:

$$M_a(ZX_b)$$

where $M$ = cobalt or bismuth
$Z$ = a group VI-A metal (i.e., chromium, molybdenum, tungsten) or phosphorus
$X$ = oxygen or sulfur
$a$ = zero to one
$b$ = 2 to 4 with the provision that when Z is phosphorus, X is oxygen and when $a$ is zero, Z is a group VI-A metal. Of the catalysts represented by the foregoing formula preference is given to those wherein Z is phosphorus, tungsten or molybdenum. Specific examples of the catalysts which fall within the general formula set forth above comprise bismuth molybdate, bismuth tungstate, cobalt molybdate, bismuth phosphate, cobalt phosphate, chromium oxide, molybdenum oxide, tungstic oxide and molybdenum sulfide. A particularly effective catalyst is bismuth molybdate. One other catalyst useful in the conversion of mesityl oxide according to this invention which does not fall within those represented by the general formula above is vanadium oxide.

The catalysts mentioned above may be prepared as briefly set forth in the following illustrative examples.

The cobalt or bismuth molybdates or tungstates may be prepared for example by adding an aqueous solution of a bismuth or cobalt salt such as a nitrate, chloride or acetate to a soluble molybdate or tungstate solution which is maintained near neutral or on the alkaline side. An ammonium tungstate or molybdate solution is often used. The resulting precipitate is aged, washed, dried and pelleted.

The cobalt or bismuth phosphate catalyst may be prepared by adding a solution of the metal salt to a soluble phosphate solution which is kept at a pH of about 6 or higher. In the alternative an aqueous phosphoric acid and metal salt solution may be added to an aqueous solution of an alkali such as ammonium hydroxide. Metal salts such as for example chlorides, acetates and nitrates are suitable. The phosphate may be disodium phosphate, trisodium phosphate, dipotassium phosphate, or diammonium phosphate.

Other useful catalysts containing the group VI-A metals are chromic oxide, tungstic oxide and of particular interest is molybdenum sulfide, the latter being obtained from natural sources such as molybdenite or by the well known reaction of sulfur or hydrogen sulfide on a molybdenum oxide. This invention is not intended to be limited by any particular method of preparing or source of the catalysts. The methods of preparing the catalysts set forth hereing are merely illustrative and any other suitable methods of obtaining the catalytic material used in the process of this invention may be utilized.

The catalysts described above may be used alone or mixed with or impregnated on a relatively inert support or extending material such as alumina, silica, asbestos, diatomaceous earth, pumice and the like. The catalyst material may be present in the reaction zone as a fixed bed or fluidized type bed.

When oxygen is used in the reaction it may be introduced in mixtures wtih other inert gases which will not adversely affect the reaction, such as for example nitrogen, carbon dioxide, and the like as found in atmospheric air. Air itself may be used. Materials which liberate oxygen in the reaction zone may also be used as a source of oxygen. An example of such a type of material is an organic peroxide or hydroperoxide and hydrogen peroxide.

When a sulfur oxide is used it is preferably in the form of sulfur dioxide. The sulfur dioxide may be introduced to the reaction zone in the free state or it may be introduced in the combined state, for example, as a hydrate. The hydrates will decompose at the reaction temperature to release sulfur dioxide. The sulfur oxides may also be employed in the form of a gaseous mixture with other gases or vapors which will not alter the reaction. Examples of such gases are oxygen, nitrogen, carbon dioxide, etc.

The reaction temperatures of the process of this invention are between about 300° C. and about 700° C. At temperatures below about 300° C., the yields of dimethyl furan are unsatisfactory. The best results are obtained at reaction temperatures of around 500° C.

The pressures within the reaction zone are not critical and the reaction proceeds well at atmospheric pressure although higher or lower pressures may be used.

The reaction takes place in a vessel which is equipped at one end with means of introducing the oxygen or sulfur dioxide and the mesityl oxide. The mesityl oxide may be preheated to its vapor state and preferably to a temperature above about 300° C. corresponding to the reaction zone temperature and mixed in the gaseous phase with the oxygen or sulfur oxide which similarly has been preheated. This gaseous mixture may then be introduced into the reaction zone. Alternatively, the mesityl oxide may be placed into the reaction zone as a liquid which will be flashed to its vapor phase at the reaction zone temperature. The reaction vessel may be suitably heated by external means.

The reaction vessel is also provided with means for removing the reaction products from the reaction zone. The products will be in the vapor phase at the reaction temperature and may be separated upon cooling and condensation. Dimethyl furan, carbon dioxide and carbon monoxide comprise the majority of the materials produced by the reaction with a small amount of methyl furfural being formed. When sulfur dioxide is used in lieu of oxygen in the conversion of mesityl oxide to dimethyl furan, dimethyl thiophene is formed in small amounts while carbon disulfide will replace some of the carbon dioxide produced.

The following examples are presented to further illustrate the process of this invention as described.

*Example I.—Bismuth molybdate catalyst*

Mixtures of mesityl oxide and oxygen (air) were passed over a bismuth molybdate catalyst at a temperature from 350° C. to 500° C. at total gas hourly space velocities (GHSV) between 1,190 and 18,900 (GHSV= volumes of gas at STP/volume of catalyst/hour).

TABLE I

| Temperature, ° C. | GHSV | Partial press, atm. | | Conversion, Percent mesityl oxide | Selectivity, Percent dimethyl furan |
|---|---|---|---|---|---|
| | | Mesityl oxide | $O_2$ | | |
| 400 | 1,300 | 0.18 | 0.12 | 60 | 15 |
| 420 | 2,300 | 0.19 | 0.03 | 49 | 29 |
| 420 | 1,430 | 0.16 | 0.21 | 93 | 10 |
| 420 | 1,280 | 0.18 | 0.12 | 73 | 19 |
| 420 | 1,190 | 0.19 | 0.05 | 70 | 22 |
| 450 | 18,900 | 0.17 | 0.13 | 73 | 59 |
| 450 | 18,300 | 0.18 | 0.10 | 61 | 61 |
| 450 | 9,900 | 0.15 | 0.24 | 95 | 21 |
| 450 | 9,700 | 0.17 | 0.14 | 75 | 48 |
| 450 | 8,100 | 0.19 | 0.07 | 51 | 54 |
| 450 | 1,280 | 0.18 | 0.12 | 87 | 27 |
| 500 | 18,900 | 0.17 | 0.13 | 92 | 43 |
| 500 | 17,700 | 0.19 | 0.07 | 94 | 41 |
| 500 | 18,900 | 0.17 | 0.13 | 37 | 77 |
| 500 | 13,400 | 0.16 | 0.18 | 61 | 61 |

*Example II.—Bismuth tungstate catalyst*

A mixture of mesityl oxide and oxygen was passed over bismuth tungstate at elevated temperatures and at rates as indicated in the following table.

TABLE II

| Temperature, ° C. | GHSV | Partial press, atm. | | Conversion, Percent mesityl oxide | Selectivity, Percent dimethyl furan |
|---|---|---|---|---|---|
| | | Mesityl oxide | $O_2$ | | |
| 452 | 1,800 | 0.17 | 0.17 | 28 | 21 |
| 498 | 3,600 | 0.17 | 0.17 | 33 | 35 |
| 546 | 5,400 | 0.17 | 0.17 | 38 | 45 |
| 597 | 7,200 | 0.17 | 0.17 | 50 | 52 |

*Example III.—Cobalt molybdate catalyst*

A mixture of mesityl oxide and oxygen was passed over cobalt molybdate at reaction conditions as indicated in the following table:

TABLE III

| Temperature, ° C. | GHSV | Partial press, atm. | | Conversion, Percent mesityl oxide | Selectivity, Percent dimethyl furan |
|---|---|---|---|---|---|
| | | Mesityl oxide | $O_2$ | | |
| 406 | 1,800 | 0.17 | 0.17 | 21 | 19 |
| 454 | 1,800 | 0.17 | 0.17 | 27 | 12 |
| 490 | 3,600 | 0.17 | 0.17 | 27 | 24 |
| 505 | 5,400 | 0.17 | 0.17 | 28 | 32 |
| 548 | 9,000 | 0.17 | 0.17 | 30 | 42 |
| 600 | 9,000 | 0.17 | 0.17 | 46 | 55 |
| 655 | 9,000 | 0.17 | 0.17 | 68 | 52 |

*Example IV.—Bismuth phosphate catalyst*

A mixture of mesityl oxide and oxygen was passed over bismuth phosphate at reaction conditions as indicated in Table IV below:

TABLE IV

| Temperature, °C. | GHSV | Partial press, atm. | | Conversion, Percent mesityl oxide | Selectivity, Percent dimethyl furan |
|---|---|---|---|---|---|
| | | Mesityl oxide | O₂ | | |
| 452 | 1,800 | 0.17 | 0.17 | 31 | 28 |
| 502 | 2,100 | 0.14 | 0.29 | 59 | 14 |
| 550 | 4,200 | 0.14 | 0.29 | 60 | 31 |
| 600 | 4,200 | 0.14 | 0.29 | 76 | 31 |

*Example V.—Vanadium oxide*

A mixture of mesityl oxide and oxygen was passed over a V₂O₅ catalyst mixed with silica at the conditions set forth in the following table.

TABLE V

| Temperature, °C. | GHSV | Partial press, atm. | | Conversion, Percent mesityl oxide | Selectivity, Percent dimethyl furan |
|---|---|---|---|---|---|
| | | Mesityl oxide | O₂ | | |
| 418 | 1,800 | 0.17 | 0.17 | 22 | 19 |
| 480 | 3,600 | 0.17 | 0.17 | 22 | 38 |
| 585 | 9,000 | 0.17 | 0.17 | 33 | 55 |
| 515 | 15,600 | 0.15 | 0.23 | 38 | 32 |
| 555 | 16,800 | 0.14 | 0.29 | 55 | 33 |
| 608 | 16,800 | 0.14 | 0.29 | 73 | 35 |

*Example VI.—Molybdenum disulfide*

A mixture of mesityl oxide and sulfur dioxide was passed over molybdenum disulfide at the conditions set forth in Table VI:

TABLE VI

| Temperature, °C. | GHSV | Conversion, Percent mesityl oxide | Selectivity, Percent dimethyl furan |
|---|---|---|---|
| 450 | 650 | 22 | 62 |
| 540 | 220 | 45 | 60 |
| 500 | 550 | 51 | 68 |
| 550 | 680 | 30 | 79 |
| 550 | 230 | 47 | 79 |
| 600 | 430 | 58 | 66 |
| 600 | 680 | 22 | 73 |

Each of the reactions set forth in the examples above were run at atmospheric pressure. The relative proportions of oxygen or sulfur oxide and mesityl oxide are not critical and may be varied to give the desired yield of dimethyl furan according to the particular catalyst and reaction conditions such as temperature and gas hourly space velocity used. It may be seen from the examples that the conversion of mesityl oxide when oxygen is used proceeds at a significantly faster rate than when sulfur dioxide is used (note GHSV values).

When sulfur dioxide is used in the process it may become necessary periodically to remove carbonaceous deposits which form on the catalyst and affect its activity. This deposit may be removed by burning it from the catalyst with oxygen at elevated temperatures. When oxygen is used in the reaction instead of sulfur dioxide catalyst regeneration generally is not necessary since no substantial coke deposits build up.

Hydrogen sulfide is one of the products formed when sulfur dioxide is used as reactant. This hydrogen sulfide may be directed to a separate vessel where it may be oxidized to sulfur dioxide which may be recycled to the reaction zone.

I claim as my invention:

1. A process for producing dimethyl furan which comprises heating a mixture of mesityl oxide and oxygen or sulfur dioxide to a temperature above about 300° C. in the presence of a catalyst material which is (a) the oxide of the formula $$M(ZO_b)$$

wherein M is cobalt or bismuth, b represents a number from 2 to 4 and Z is group VI-A metal or phosphorus, (b) group VI-A oxides of from 2 to 4 oxygen atoms,
(c) group VI-A sulfides of from 2 to 4 sulfur atoms, or
(d) vanadium oxide.

2. A process for producing dimethyl furan which comprises heating a mixture of mesityl oxide and a member selected from the group consisting of oxygen and sulfur dioxide to a temperature above about 300° C. in the presence of a catalyst selected from the group consisting of bismuth molybdate, bismuth tungstate, cobalt molybdate, bismuth phosphate, molybdenum sulfide and vanadium oxide.

3. The process of claim 2 wherein the temperature is between about 300° C. and about 700° C.

4. A process for the preparation of dimethyl furan which comprises heating a mixture of mesityl oxide and oxygen at a temperature between about 300° C. and about 700° C. in the presence of a catalyst selected from the group consisting of bismuth molybdate, bismuth tungstate, cobalt molybdate, bismuth phosphate, molybdenum sulfide and vanadium oxide.

5. The process of claim 4 wherein the catalyst is bismuth molybdate.

6. A process for preparing dimethyl furan which comprises heating a mixture of mesityl oxide and sulfur dioxide at a temperature between about 300° C. and about 700° C. in the presence of a catalyst selected from the group consisting of bismuth molybdate, bismuth tungstate, cobalt molybdate, bismuth phosphate, vanadium oxide and molybdenum sulfide.

7. The process of claim 6 wherein the catalyst is molybdenum sulfide.

No references cited.

NICHOLAS S. RIZZO, *Primary Examiner.*

J. H. TURNIPSEED, *Assistant Examiner.*